(12) United States Patent
    Takizawa

(10) Patent No.: US 11,052,542 B2
(45) Date of Patent: *Jul. 6, 2021

(54) ROBOT SYSTEM AND CONTROL METHOD OF ROBOT

(71) Applicant: OMRON Corporation, Kyoto (JP)

(72) Inventor: Kazuhiro Takizawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 294 days.

This patent is subject to a terminal disclaimer.

(21) Appl. No.: 16/275,346

(22) Filed: Feb. 14, 2019

(65) Prior Publication Data

US 2019/0283256 A1    Sep. 19, 2019

(30) Foreign Application Priority Data

Mar. 15, 2018 (JP) .............................. JP2018-048501
Jan. 28, 2019 (JP) .............................. JP2019-012532

(51) Int. Cl.
  *B05B 12/08* (2006.01)
  *B05B 12/12* (2006.01)
  (Continued)

(52) U.S. Cl.
  CPC ........... *B25J 9/1697* (2013.01); *B05B 12/084* (2013.01); *B05B 12/124* (2013.01);
  (Continued)

(58) Field of Classification Search
  CPC ... B25J 19/02; B25J 19/021; B25J 9/16; B25J 9/1694; B25J 9/1697; B25J 11/0075;
  (Continued)

(56) References Cited

U.S. PATENT DOCUMENTS 9,168,557 B2 * 10/2015 Saeki .................... B05C 1/0886
10,478,846 B2 * 11/2019 Franks ................ B05B 13/0431
(Continued)

FOREIGN PATENT DOCUMENTS

DE   102014116830 A1 *  5/2016  ......... B05C 11/1018
JP   2004298697          10/2004
JP   2010042325           2/2010
(Continued)

OTHER PUBLICATIONS

"Search Report of Europe Counterpart Application", dated Jul. 23, 2019, pp. 1-6.

*Primary Examiner* — Khoi H Tran
*Assistant Examiner* — Sarah A Tran
(74) *Attorney, Agent, or Firm* — JCIPRNET

(57) ABSTRACT

A robot system and a control method of a robot are provided. A robot, a liquid application part, an application thickness measurement part and a control part are provided, the liquid application part being provided on the robot, the application thickness measurement part measuring an application thickness of a liquid applied by the liquid application part, the control part, in a case where the application thickness measured by the application thickness measurement part is greater than a predetermined thickness, driving the robot in a manner of moving the liquid application part closer to an application object, and in a case where the application thickness measured by the application thickness measurement part is less than the predetermined thickness, driving the robot in a manner of moving the liquid application part away from the application object.

3 Claims, 6 Drawing Sheets

(51) Int. Cl.
  *B05B 13/04* (2006.01)
  *B05C 11/10* (2006.01)
  *B05C 5/02* (2006.01)
  *B25J 11/00* (2006.01)
  *B25J 19/02* (2006.01)
  *B25J 9/16* (2006.01)

(52) U.S. Cl.
  CPC ........ *B05B 13/0431* (2013.01); *B05C 5/0216* (2013.01); *B05C 11/1005* (2013.01); *B25J 11/0075* (2013.01)

(58) Field of Classification Search
  CPC ..... B05B 12/08; B05B 12/084; B05B 12/124; B05B 13/00; B05B 13/04; B05B 13/0431; B05C 5/00; B05C 5/0208; B05C 5/0212; B05C 5/0216; B05C 11/10; B05C 11/1002; B05C 11/1005
  See application file for complete search history.

(56) References Cited

U.S. PATENT DOCUMENTS

2013/0284833 A1* 10/2013 Fritz ................. B05B 5/025
                                                                 239/690
2017/0252765 A1    9/2017 Medard et al.

FOREIGN PATENT DOCUMENTS

| KR | 20130007134 A | * | 1/2013 | ............ B05B 15/68 |
| WO | 2005018813 | | 3/2005 | |
| WO | 2009118072 | | 10/2009 | |

* cited by examiner

ROBOT SYSTEM AND CONTROL METHOD OF ROBOT

CROSS-REFERENCE TO RELATED APPLICATION

This application claims the priority benefit of Japan Application No. 2018-048501, filed on Mar. 15, 2018. The entirety of the above-mentioned patent application is hereby incorporated by reference herein and made a part of this specification.

BACKGROUND

Technical Field

The disclosure relates to a robot system and a control method of a robot.

Related Art

Patent Document 1 discloses a technique of attaching a die head to an actuator that moves up and down, measuring a distance between the die head and a surface of a substrate by a distance measuring sensor provided on the die head, and maintaining the distance between the die head and the surface of the substrate at a set distance. According to Patent Document 1, a uniform coating film is formed on the substrate in accordance with undulation of the substrate.

Patent Document 2 discloses a technique of setting a position of a chemical solution nozzle relative to a base according to viscosity of a solution. According to Patent Document 2, a high-viscosity solution is applied to a surface of the base with a uniform film thickness.

PATENT DOCUMENTS

[Patent Document 1] Japanese Laid-open No. 2004-298697

[Patent Document 2] Japanese Laid-open No. 2010-042325

However, if a robot is used to apply a liquid to a substrate or the like, an application thickness of the liquid is affected by not only the undulation of the substrate but also ambient temperature, remaining amount of the liquid in a liquid application part, or pressure inside the liquid application part and so on. In this regard, in the techniques described in Patent Documents 1 and 2, an application amount of the liquid cannot be controlled in real time in accordance with a change in the ambient temperature and so on, and the liquid cannot be applied with a uniform layer thickness.

Therefore, the disclosure provides a robot system and a control method of a robot capable of applying a liquid with a uniform layer thickness even if there is a change in conditions such as ambient temperature and so on.

SUMMARY

A robot system of the disclosure includes:
a robot;
a liquid application part provided on the robot;
an application thickness measurement part measuring an application thickness of a liquid applied by the liquid application part; and
a control part, in a case where the application thickness measured by the application thickness measurement part is greater than a predetermined thickness, driving the robot in a manner of moving the liquid application part closer to an application object, and in a case where the application thickness measured by the application thickness measurement part is less than the predetermined thickness, driving the robot in a manner of moving the liquid application part away from the application object.

A control method of a robot of the disclosure includes following steps:
measuring an application thickness of a liquid applied by a liquid application part provided on the robot;
in a case where the application thickness measured by an application thickness measurement part is greater than a predetermined thickness, driving the robot in a manner of moving the liquid application part closer to an application object; and
in a case where the application thickness measured by the application thickness measurement part is less than the predetermined thickness, driving the robot in a manner of moving the liquid application part away from the application object.

Figure 8:
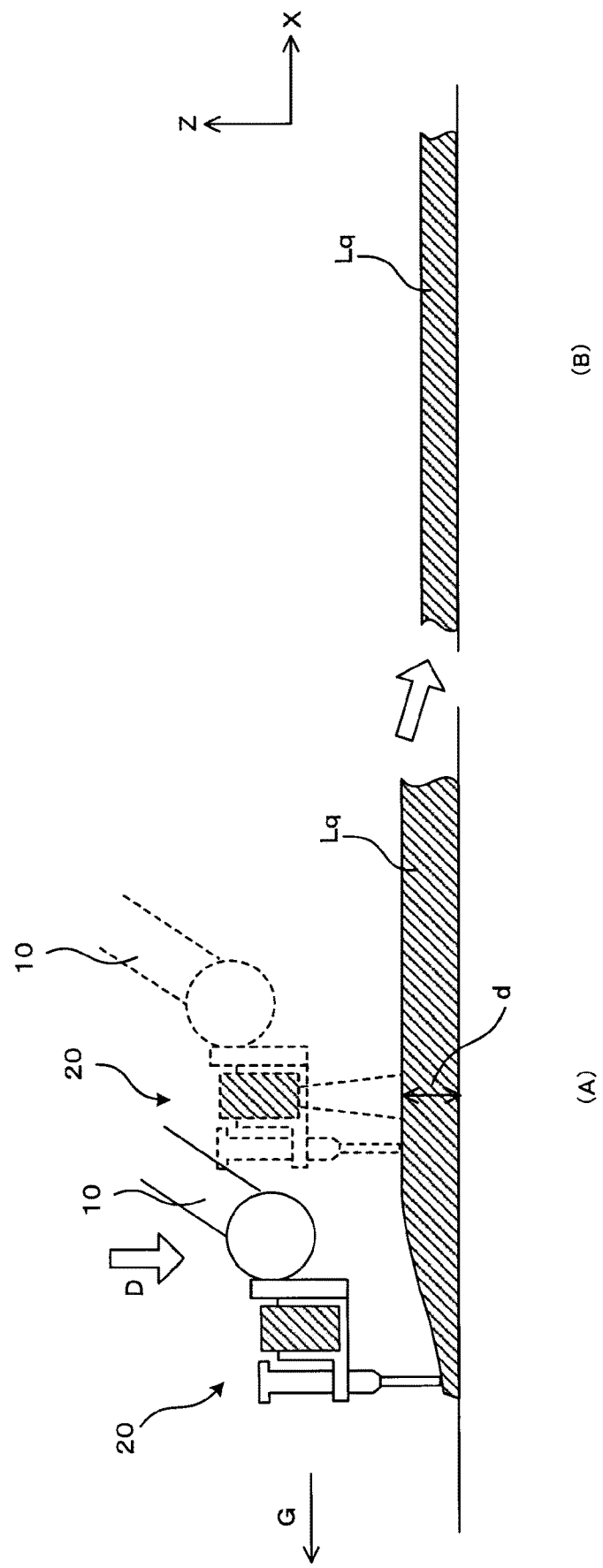

(A) and (B) of FIG. 8 are diagrams for illustrating application amount control when the application amount is large.

Figure 9:
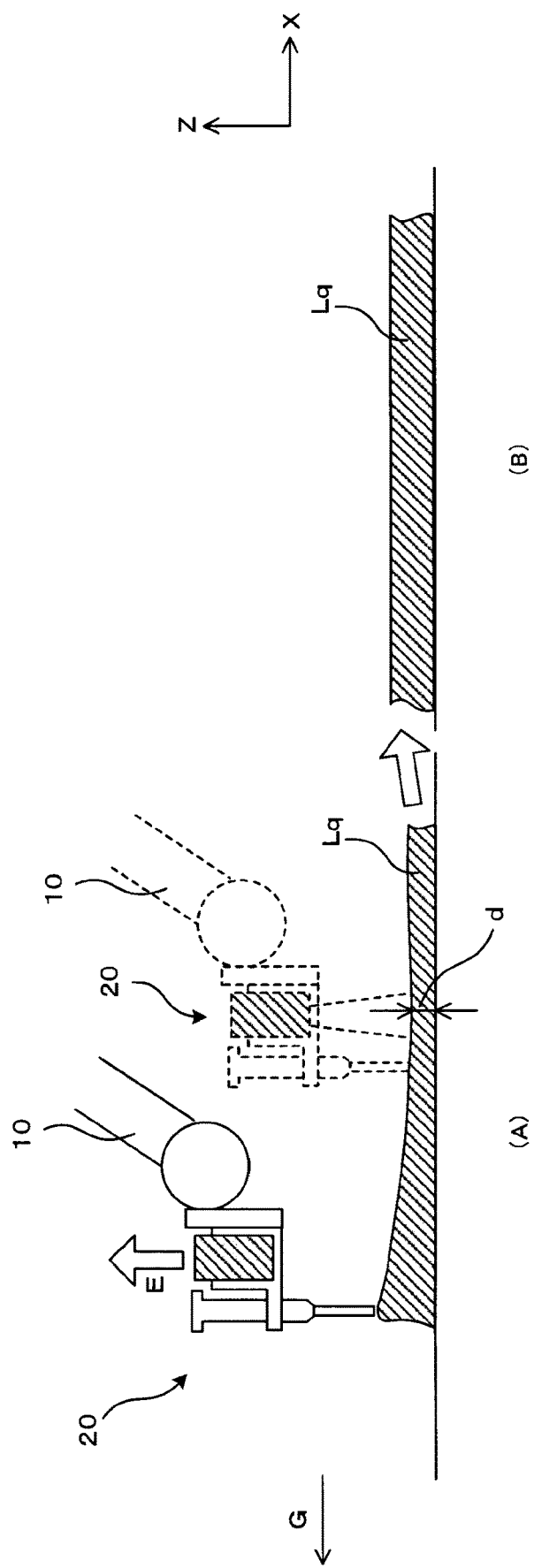

(A) and (B) of FIG. 9 are diagrams for illustrating the application amount control when the application amount is small.

DESCRIPTION OF THE EMBODIMENTS

Hereinafter, embodiments of the disclosure are explained in detail with reference to the drawings.

(Robot System)

Figure 1:
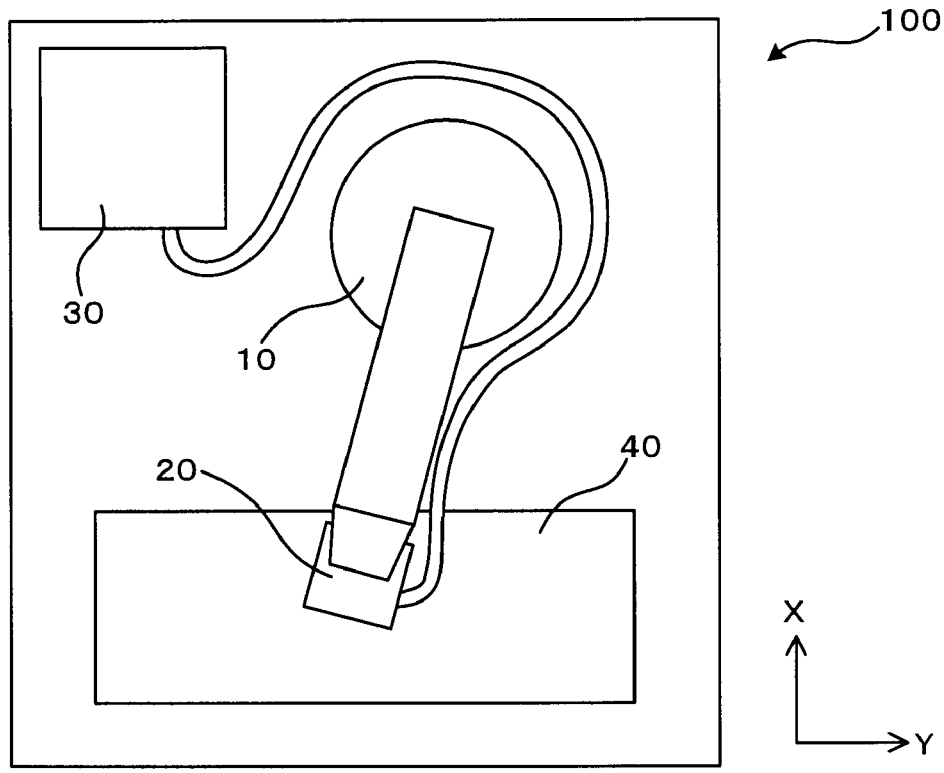
FIG. 1 is a top view showing a robot system in an embodiment.

FIG. 1 is a top view showing a robot system 100 in an embodiment of the present disclosure. As shown in FIG. 1, the robot system 100 in the present embodiment includes a robot 10, a dispenser head 20 as a liquid application part, a dispenser controller 30 as a control device of the robot 10, and a workpiece 40 as an application object.

The robot 10 is, for example, an arm type six-axis vertical articulated robot. The arm type six-axis vertical articulated robot includes a power source such as a servomotor or the like, wherein the servomotor is driven by a control signal output from the dispenser controller 30 based on a robot control program and each joint axis is operated.

The dispenser head 20 applies a liquid to the workpiece 40. As the liquid, a low to medium-viscosity liquid such as a sealer material, water-based printing ink, engine oil, olive oil or the like, for example, may be used.

Figure 2:
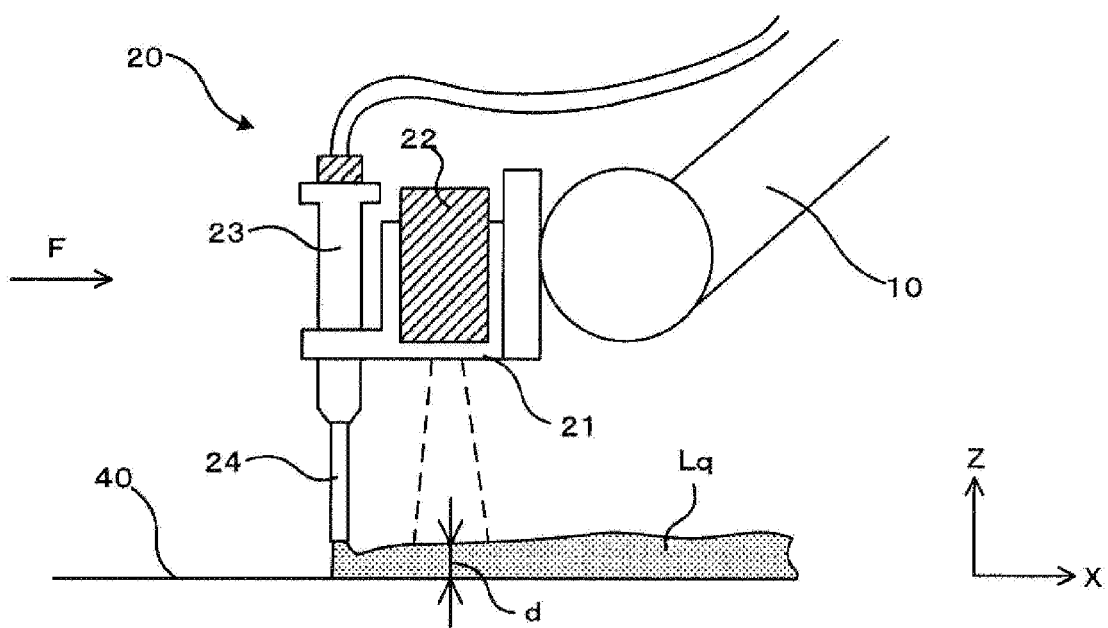
FIG. 2 is a side view showing a configuration of a dispenser head.

FIG. 2 is a side view showing a configuration of the dispenser head 20. As shown in FIG. 2, the dispenser head 20 includes a holder 21, a sensor 22, a syringe 23 and a nozzle 24. The holder 21 holds the sensor 22 and the syringe 23. The sensor 22 is a sensor for detecting an application liquid height d being a height of the liquid applied to the workpiece 40. As an example, a laser sensor as an optical sensor may be used. The syringe 23 is a container containing the liquid to be applied. The nozzle 24 is a tube attached to a tip of the syringe 23 and discharging the liquid.

Figure 3:
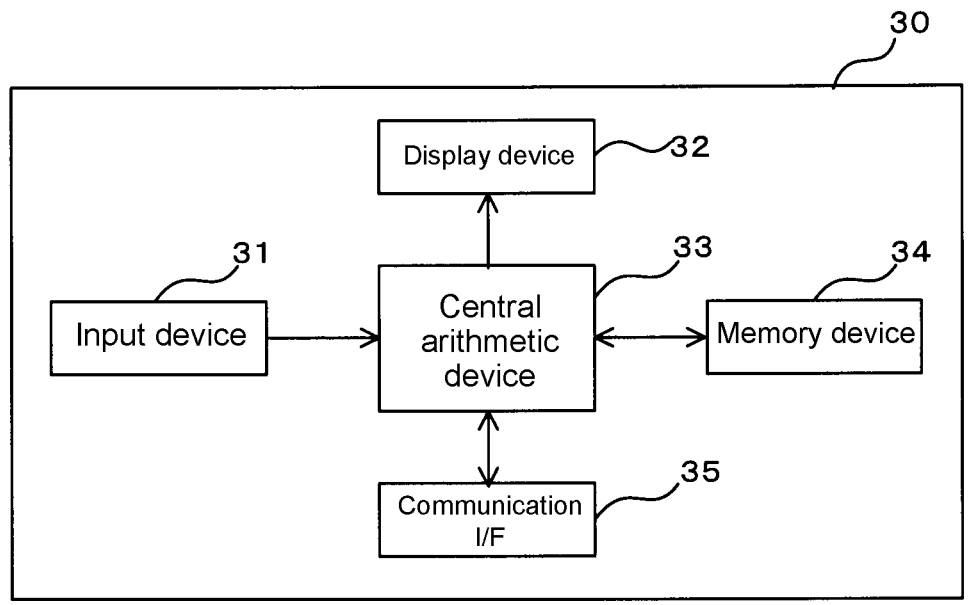
FIG. 3 is a block diagram showing hardware configuration of a dispenser controller.

The dispenser controller 30 is a control device controlling the robot 10 to adjust an application amount of the liquid. FIG. 3 shows hardware configuration of the dispenser controller 30. As shown in FIG. 3, the dispenser controller 30 includes an input device 31, a display device 32, a central arithmetic device 33, a memory device 34 and a communication interface (I/F) 35. As an example, the input device 31 is composed of a keyboard and so on. As an example, the display device 32 is composed of a display. As an example, the central arithmetic device 33 is composed of a central processing unit (CPU). The memory device 34 includes a nonvolatile memory device and a volatile memory device, wherein the nonvolatile memory device stores the robot control program and a sequence control program and so on. In addition, the volatile memory device is properly used as a work memory during execution of the central arithmetic device 33. The communication I/F 35 is, for example, an interface of a serial line such as RS232C or the like, and inputs an output value of the sensor 22 and communicates with the robot 10. The communication I/F 35 may also be an interface of other communication line.

Figure 4:
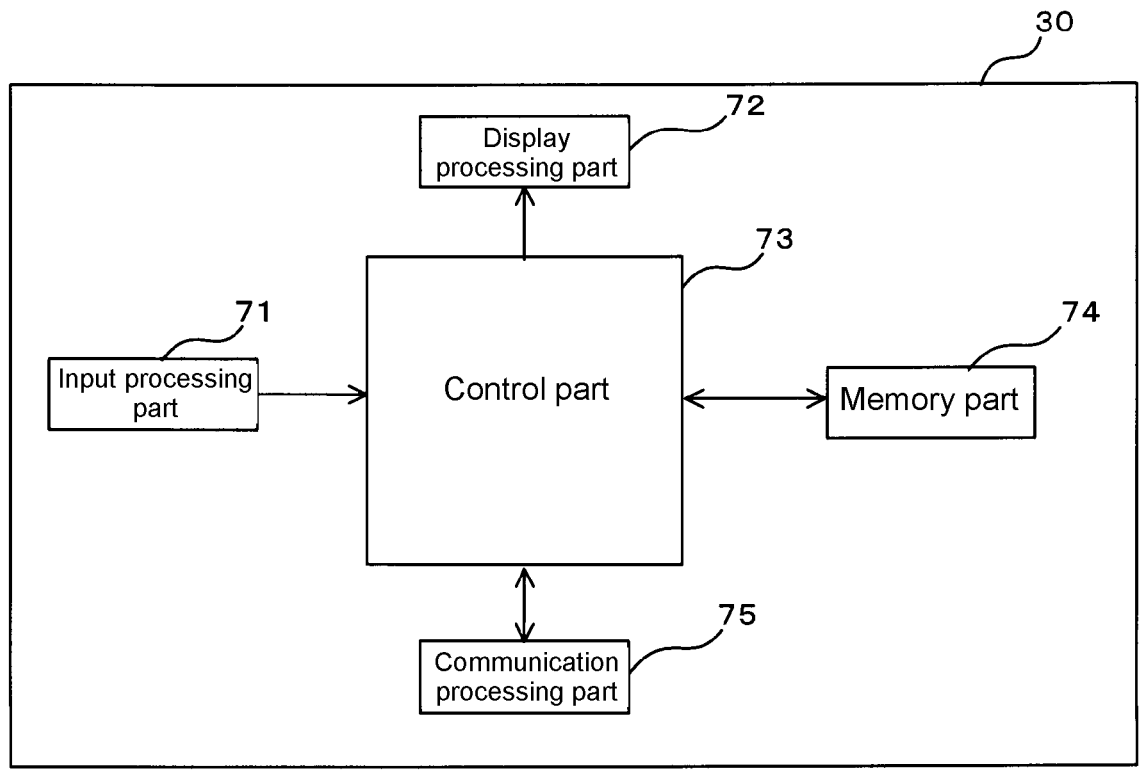
FIG. 4 is a functional block diagram of the dispenser controller.

FIG. 4 is a functional block diagram of the dispenser controller 30 in the present embodiment. The dispenser controller 30 functions as an input processing part 71, a display processing part 72, a control part 73, a memory part 74, and a communication processing part 75. The processing part 71 processes an input from the input device 31. The display processing part 72 creates display data to be output to the display device 32. The control part 73 controls driving of the robot 10. Details of functions of the control part 73 are described later. The memory part 74 stores the robot control program and the sequence control program and so on.

(Application Thickness Measurement Method)

Figure 5:
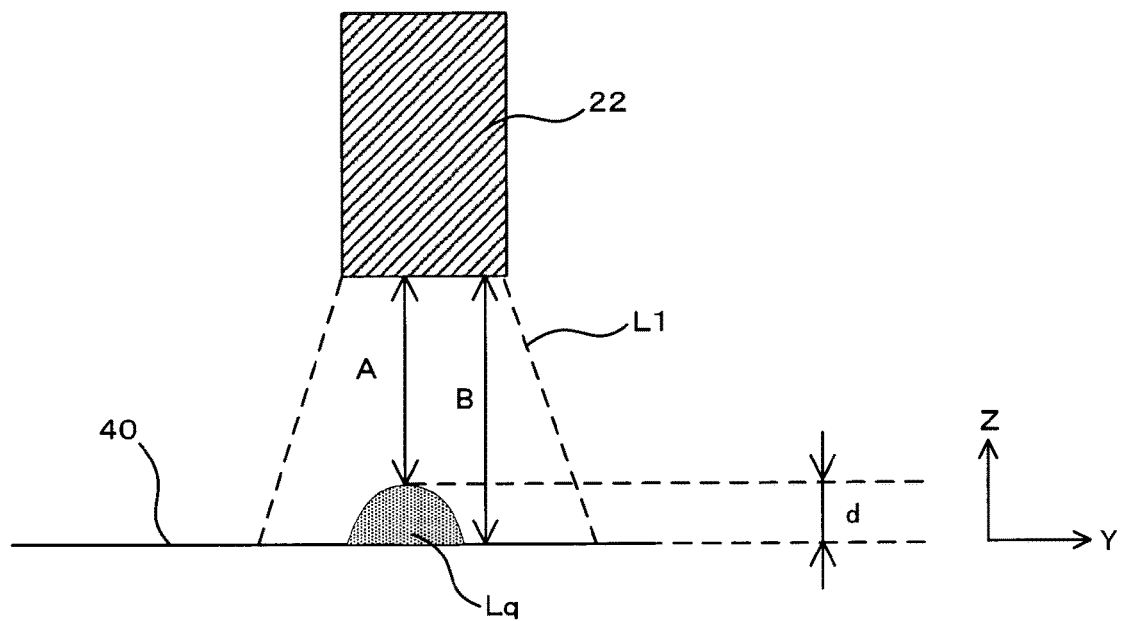
FIG. 5 is a front view of a sensor, an application liquid and a workpiece as viewed from a direction of an arrow F shown in FIG. 2.

Next, an application thickness measurement method in the robot system 100 of the present embodiment is explained. FIG. 5 is a front view of the sensor 22, an application liquid Lq and the workpiece 40 as viewed from the direction of the arrow F shown in FIG. 2.

As shown in FIG. 5, the sensor 22 irradiates the workpiece 40 and the application liquid Lq with laser light L1, and measures a distance A from the sensor 22 to the application liquid Lq and a distance B from the sensor 22 to the workpiece 40 at the same time. Further, the sensor 22 subtracts the distance A from the distance B to measure the application liquid height d. In this way, the sensor 22 has a function of measuring the application liquid height d. In the present embodiment, since the distance B from the sensor 22 to the workpiece 40 can be measured, even if a surface of the workpiece 40 as the application object is not flat but undulating, the application liquid height d can be measured accordingly. The application liquid height d measured by the sensor 22 is input to the control part 73 via the communication processing part 75.

(Control Method of Application Amount)

Figures 6A, 6B:
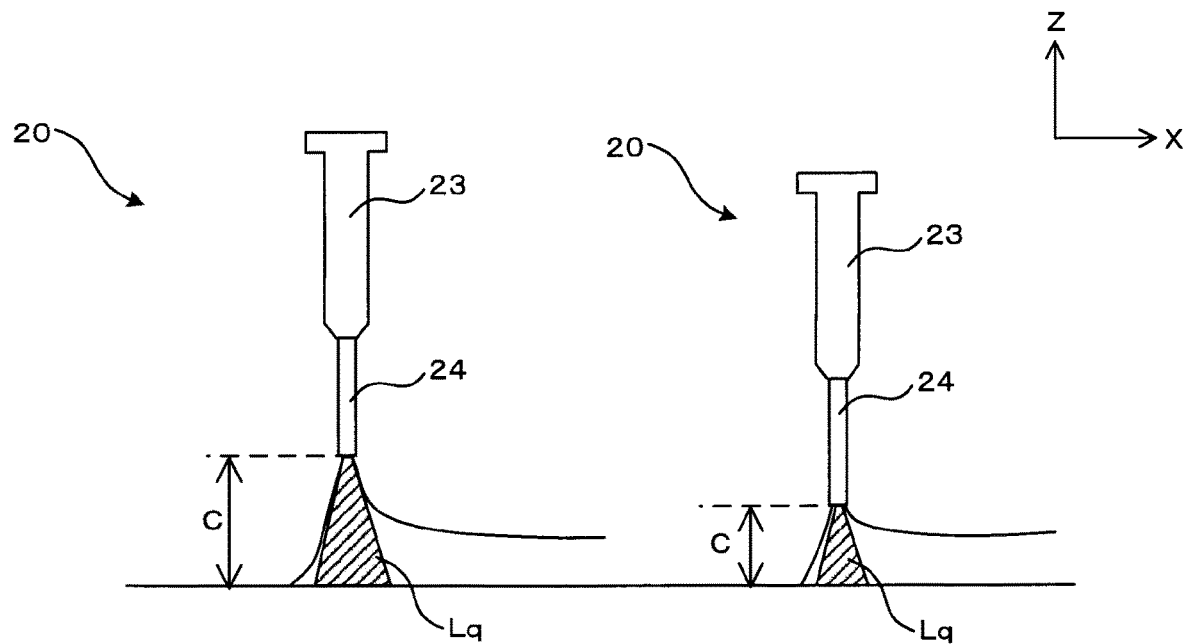
FIG. 6(A) illustrates a discharge of the application liquid in the case where the workpiece and a nozzle are far from each other.
FIG. 6(B) illustrates the discharge of the application liquid in the case where the workpiece and the nozzle are not as far from each other as they are in FIG. 6(A).

FIG. 6(A) and FIG. 6(B) are diagrams for illustrating a control method of an application amount of the application liquid Lq to the workpiece 40 in the present embodiment. In the dispenser head 20, by creating negative pressure inside the syringe 23, it is suppressed that the application liquid Lq drops down due to gravity. By creating atmospheric pressure or positive pressure inside the syringe 23, the application liquid Lq is discharged.

At this moment, when a distance C between the workpiece 40 as the application object and the nozzle 24 is far as shown in FIG. 6(A), due to the gravity of the application liquid Lq coming out from the nozzle 24, a larger amount of application liquid Lq is discharged than in the case as shown in FIG. 6(B) where the distance C is not far. In the present embodiment, by utilizing this action, the robot 10 is controlled by the dispenser controller 30, and the application amount is controlled by changing the distance between the workpiece 40 as the application object and the nozzle 24.

Figure 7:
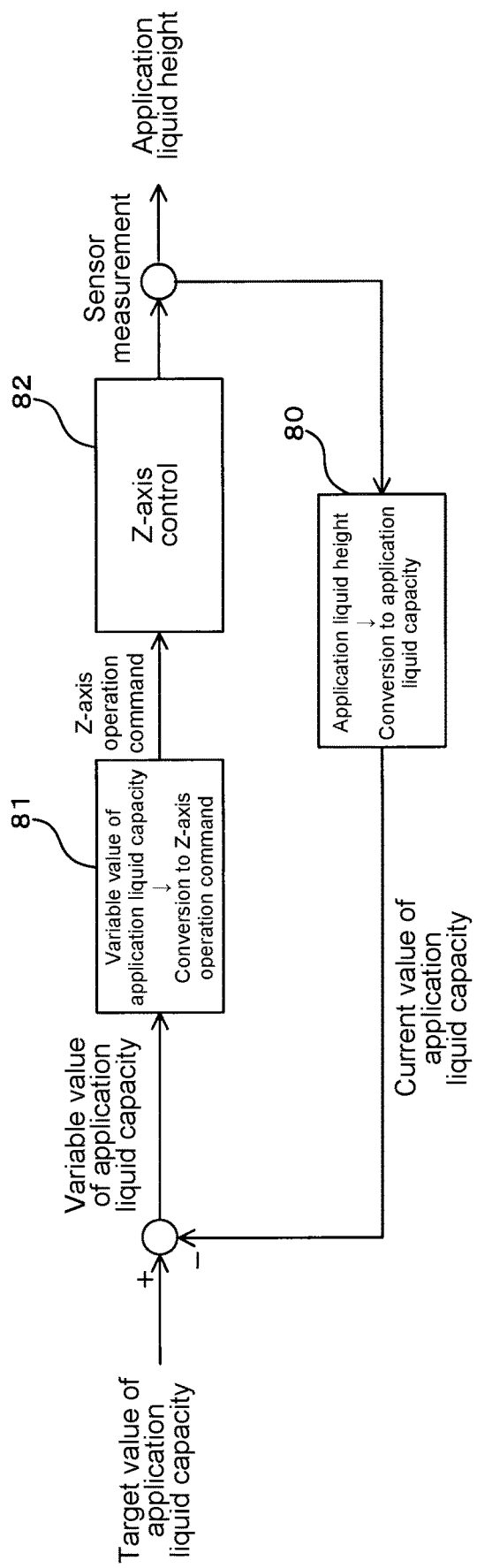
FIG. 7 is a block diagram showing a control loop of Z-axis (vertical direction) control of the dispenser head.

Next, the control of the application amount of the present embodiment is more specifically explained with reference to FIG. 7 to FIG. 9. FIG. 7 is a block diagram showing a control loop of Z-axis (vertical direction) control of the dispenser head in the present embodiment. As shown in FIG. 7, the control part 73 of the dispenser controller 30 measures the application liquid height d by the sensor 22 and inputs a measured value. Next, the control part 73 converts the application liquid height d into an application liquid capacity by a height-capacity conversion function 80. As a result, since a current value of the application liquid capacity is known, the control part 73 returns the current value as feedback.

When the application liquid Lq is applied, a target value of the application liquid capacity is determined in advance. From the target value of the application liquid capacity and the feedback of the current value of the application liquid capacity, the control part 73 calculates a variable value relative to the target value of the application liquid capacity. Next, the control part 73 inputs the variable value of the application liquid capacity to a variable value-command conversion function 81. In the variable value-command conversion function 81, if the variable value of the application liquid capacity is greater than the target value of the application liquid capacity, i.e., if the application amount is large, a command to move the dispenser head 20 in a Z-axis minus direction (downward direction) is output. In the variable value-command conversion function 81, if the variable value of the application liquid capacity is smaller than the target value of the application liquid capacity, i.e., if the application amount is small, a command to move the dispenser head 20 in a Z-axis plus direction (upward direction) is output.

An operation command in the Z-axis direction that is output from the variable value-command conversion function 81 is input to a Z-axis control function 82. In the Z-axis control function 82, the dispenser head 20 is moved according to the input operation command. In the present embodiment, by the control loop as above, the application amount is controlled.

Next, specific examples of the application amount control in the cases of large application amount and small application amount are explained with reference to FIG. 8 and FIG. 9. (A) and (B) of FIG. 8 are diagrams for illustrating the application amount control when the application amount is large. (A) and (B) of FIG. 9 are diagrams for illustrating the application amount control when the application amount is small. In FIG. 8 and FIG. 9, an application direction of the dispenser head 20 is a direction of an arrow G.

First of all, the case of large application amount is explained. Firstly, in a position where the dispenser head 20 is shown in dashed lines in (A) of FIG. 8, the control part 73 measures the application liquid height d by the sensor 22. The control part 73 converts the application liquid height d into the application liquid capacity and compares it with the target value of the application liquid capacity. In the case where the current application liquid capacity is greater than the target value of the application liquid capacity, as shown in solid lines in (A) of FIG. 8, the control part 73 moves the dispenser head 20 in a direction of an arrow D, i.e., the Z-axis minus direction.

By moving the dispenser head 20 in the Z-axis minus direction, the distance between the nozzle 24 and an applied surface of the workpiece 40 is reduced, and the application amount can be reduced. As a result, as shown in (B) of FIG. 8, as time passes, the application liquid Lq fits a constant height, and the application liquid height d is lower than the application liquid height d at the time of measurement as described above.

Next, the case of small application amount is explained. Firstly, in a position where the dispenser head 20 is shown in dashed lines in (A) of FIG. 9, the control part 73 measures the application liquid height d by the sensor 22. The control part 73 converts the application liquid height d into the application liquid capacity and compares it with the target value of the application liquid capacity. In the case where the current application liquid capacity is smaller than the target value of the application liquid capacity, as shown in solid lines in (A) of FIG. 9, the control part 73 moves the dispenser head 20 in a direction of an arrow E, i.e., the Z-axis plus direction.

By moving the dispenser head 20 in the Z-axis plus direction, the distance between the nozzle 24 and the applied surface of the workpiece 40 is increased, and the application amount can be increased. As a result, as shown in (B) of FIG. 9, as time passes, the application liquid Lq fits a constant height, and the application liquid height d is higher than the application liquid height d at the time of measurement as described above.

As described above, according to the present embodiment, the dispenser head 20 is moved in the Z-axis direction, and the distance between the nozzle 24 and the applied surface on the workpiece 40 where the application liquid Lq is applied is linearly controlled so as to be kept constant. As a result, even if there is a change in a discharge amount of the application liquid Lq from the nozzle 24 due to a change in temperature, remaining amount of the application liquid Lq and the pressure inside the syringe 23 of the dispenser head 20, the application thickness of the application liquid Lq on the workpiece 40 can be kept constant.

In addition, according to the present embodiment, even in the case where undulation occurs in the surface of the workpiece 40, since the distance B from the sensor 22 to the workpiece 40 can be measured by the sensor 22, even if the surface of the workpiece 40 as the application object is not flat but undulating, the application liquid height d can be reliably measured accordingly. As a result, even if undulation occurs in the surface of the workpiece 40, the application thickness of the application liquid Lq on the workpiece 40 can be kept constant.

In the above robot system, the liquid is applied by the liquid application part provided on the robot, and the application thickness of the liquid is measured by the application thickness measurement part. In the case where the application thickness measured by the application thickness measurement part is greater than the predetermined thickness, the control part drives the robot in a manner of moving the liquid application part closer to the application object. In the case where the application thickness measured by the application thickness measurement part is less than the predetermined thickness, the control part drives the robot in a manner of moving the liquid application part away from the application object.

Accordingly, according to the above robot system, since a distance between the liquid application part and the application object is linearly controlled in real time according to the application thickness of the liquid while the application thickness is measured, even if there is a change in the conditions such as ambient temperature and so on, the liquid can be applied with a uniform layer thickness.

In the robot system of an embodiment, the liquid application part includes a syringe and a nozzle, wherein a discharge of the liquid is suppressed by creating negative pressure inside the syringe, and the discharge of the liquid is performed by creating atmospheric pressure or positive pressure inside the syringe.

In the robot system of the embodiment, in the case where the pressure inside the syringe is created to positive pressure, a discharge amount of the liquid varies depending on a distance between the nozzle and the application object. The application thickness of the discharged liquid is measured, and the distance between the liquid application part and the application object is linearly controlled in real time according to the application thickness. Accordingly, even if there is a change in the conditions such as ambient temperature and so on, the liquid can be applied with a uniform layer thickness.

In the robot system of an embodiment, the application thickness measurement part is an optical sensor, measures a distance from the optical sensor to a surface of the application object and a distance from the optical sensor to a surface of the liquid applied on the surface of the application object, and measures the application thickness of the liquid by calculating a difference between these distances.

In the robot system of the embodiment, the optical sensor measures the distance from the optical sensor to the surface of the application object. Also, the optical sensor measures the distance from the optical sensor to the surface of the liquid applied on the surface of the application object. Then, by calculating the difference between these distances, the optical sensor measures the application thickness of the liquid. Accordingly, not only in the case where there is a change in the conditions such as ambient temperature and so on, even in a case where undulation occurs in the surface of the application object, the liquid can also be applied with a uniform layer thickness.

According to the control method of the disclosure, since a distance between the liquid application part and the application object is linearly controlled in real time according to the application thickness of the liquid while the application thickness is measured, even if there is a change in the conditions such as ambient temperature and so on, the liquid can be applied with a uniform layer thickness.

As clear from the above, according to the robot system and the control method of a robot of the disclosure, even if there is a change in the conditions such as ambient temperature and so on, the liquid can be applied with a uniform layer thickness.

The above embodiments are exemplary, and various modifications are possible without departing from the scope of the disclosure. The embodiments described above may each be established independently, but may also be combined with each other. Also, various features in different embodiments may also each be established independently, but combinations of the features in the different embodiments are also possible.

What is claimed is:

1. A robot system comprising:
   a robot;
   a dispenser head provided on the robot;
   an optical sensor measuring an application thickness of a liquid applied by the dispenser head; and
   a processor, in a case where the application thickness measured by the optical sensor is greater than a predetermined thickness, driving the robot in a manner of moving the dispenser head closer to an application object, and in a case where the application thickness measured by the optical sensor is less than the predetermined thickness, driving the robot in a manner of moving the dispenser head away from the application object,
   wherein the dispenser head comprises a syringe and a nozzle, wherein a discharge of the liquid is suppressed by creating negative pressure inside the syringe, and the discharge of the liquid is performed by creating atmospheric pressure or positive pressure inside the syringe,
   the processor adjusts a supply amount of the liquid to the application object by adjusting a distance between the nozzle and the application object.

2. The robot system according to claim 1 wherein the optical sensor measures a distance from the optical sensor to a surface of the application object and a distance from the optical sensor to a surface of the liquid applied on the surface of the application object, and measures the application thickness of the liquid by calculating a difference between these distances.

3. A control method of a robot, comprising following steps:
   measuring an application thickness of a liquid applied by a dispenser head provided on the robot;
   in a case where the application thickness measured by an optical sensor is greater than a predetermined thickness, driving the robot in a manner of moving the dispenser head closer to an application object; and
   in a case where the application thickness measured by the optical sensor is less than the predetermined thickness, driving the robot in a manner of moving the dispenser head away from the application object,
   wherein the dispenser head comprises a syringe and a nozzle, wherein a discharge of the liquid is suppressed by creating negative pressure inside the syringe, and the discharge of the liquid is performed by creating atmospheric pressure or positive pressure inside the syringe,
   wherein the control method further comprises:
   adjusting a supply amount of the liquid to the application object by adjusting a distance between the nozzle and the application object.

* * * * *